(12) United States Patent
Da Silva et al.

(10) Patent No.: US 10,230,590 B2
(45) Date of Patent: Mar. 12, 2019

(54) PERFORMANCE METRIC OF A SYSTEM CONVEYING WEB CONTENT

(71) Applicant: Telefonaktiebolaget LM Ericsson (publ), Stockholm (SE)

(72) Inventors: Icaro L. J. Da Silva, Bromma (SE); Fredrik Kuivinen, Johanneshov (SE); Jing Fu, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 168 days.

(21) Appl. No.: 15/035,398

(22) PCT Filed: Dec. 3, 2013

(86) PCT No.: PCT/EP2013/075363
§ 371 (c)(1),
(2) Date: May 9, 2016

(87) PCT Pub. No.: WO2015/081988
PCT Pub. Date: Jun. 11, 2015

(65) Prior Publication Data
US 2016/0294640 A1    Oct. 6, 2016

(51) Int. Cl.
*G06F 15/173* (2006.01)
*H04L 12/24* (2006.01)
(Continued)

(52) U.S. Cl.
CPC ...... *H04L 41/5009* (2013.01); *H04L 41/5083* (2013.01); *H04L 47/193* (2013.01);
(Continued)

(58) Field of Classification Search
CPC .............. H04L 41/5009; H04L 41/5083; H04L 47/193; H04L 47/6215; H04L 61/2007; H04L 67/021; H04L 69/22
(Continued)

(56) References Cited

U.S. PATENT DOCUMENTS 5,809,308 A * 9/1998 Tirumalai ............. G06F 8/4452
717/150
7,406,399 B2 * 7/2008 Furem ..................... E02F 9/267
37/379
(Continued)

FOREIGN PATENT DOCUMENTS

| CN | 1433239 A | 7/2003 |
|---|---|---|
| CN | 101222349 A | 7/2008 |
| WO | WO 2013/149207 A1 | 10/2013 |

OTHER PUBLICATIONS

International Search Report and Written Opinion of the International Searching Authority, Application No. PCT/EP2013/075363, dated Feb. 20, 2014.
(Continued)

*Primary Examiner* — Thu Ha T Nguyen
(74) *Attorney, Agent, or Firm* — Sage Patent Group

(57) ABSTRACT

Obtaining a performance metric in a system for conveying web content from a server node to a terminal node along one or more network nodes, involving an inspecting of a data flow transmitting said web content toward the terminal node for extracting web content records. The extracted web content records are correlated to at least one web session. The extracted web content records are associated to a performance of one or more of said nodes. The performance metric is calculated from the correlated and associated web content records for at least one web session and one or more of said nodes.

21 Claims, 5 Drawing Sheets

(51) Int. Cl.
  *H04L 29/08* (2006.01)
  *H04L 12/801* (2013.01)
  *H04L 12/863* (2013.01)
  *H04L 29/12* (2006.01)
  *H04L 29/06* (2006.01)

(52) U.S. Cl.
  CPC ...... *H04L 47/6215* (2013.01); *H04L 61/2007* (2013.01); *H04L 67/02* (2013.01); *H04L 69/22* (2013.01)

(58) Field of Classification Search
  USPC .................................................. 709/223, 224
  See application file for complete search history.

(56) References Cited

U.S. PATENT DOCUMENTS

| | | | | |
|---|---|---|---|---|
| 7,685,270 | B1* | 3/2010 | Vermeulen | G06Q 30/0603 370/252 |
| 7,689,394 | B2* | 3/2010 | Furem | E02F 9/2054 703/8 |
| 8,335,838 | B2 | 12/2012 | Zhang et al. | |
| 8,407,340 | B2 | 3/2013 | Zamora Cura | |
| 8,699,553 | B2* | 4/2014 | Rosenqvist | H04L 25/0238 375/227 |
| 9,167,021 | B2* | 10/2015 | Parthasarathy | H04L 41/5083 |
| 9,824,407 | B2* | 11/2017 | Liyanage | G06Q 50/01 |
| 10,043,197 | B1* | 8/2018 | Benisch | G06Q 30/0248 |
| 2002/0099818 | A1* | 7/2002 | Russell | H04L 67/02 709/224 |
| 2002/0120727 | A1* | 8/2002 | Curley | H04L 41/12 709/223 |
| 2003/0121983 | A1 | 7/2003 | Herle | |
| 2006/0271677 | A1* | 11/2006 | Mercier | G06F 17/30197 709/224 |
| 2012/0078977 | A1* | 3/2012 | Shibata | G06F 17/30793 707/803 |
| 2012/0089544 | A1 | 4/2012 | Zeine et al. | |
| 2012/0311126 | A1* | 12/2012 | Jadallah | H04L 41/5067 709/224 |
| 2013/0021933 | A1* | 1/2013 | Kovvali | H04W 88/18 370/252 |
| 2014/0056318 | A1* | 2/2014 | Hansson | H04J 3/0667 370/503 |
| 2014/0089402 | A1* | 3/2014 | Liyanage | G06Q 50/01 709/204 |
| 2015/0142872 | A1* | 5/2015 | Polishchuk | G06Q 30/0242 709/203 |
| 2015/0149625 | A1* | 5/2015 | Piro, Jr. | H04L 43/0858 709/224 |
| 2015/0304198 | A1* | 10/2015 | Angelov | H04L 63/1425 709/224 |
| 2016/0275152 | A1* | 9/2016 | Gunjan | G06N 5/02 |
| 2016/0294640 | A1* | 10/2016 | Da Silva | H04L 67/02 |
| 2016/0321381 | A1* | 11/2016 | English | G06F 17/5009 |
| 2017/0091543 | A1* | 3/2017 | Guo | G06K 9/00456 |
| 2017/0126516 | A1* | 5/2017 | Tiagi | H04L 43/04 |
| 2017/0215094 | A1* | 7/2017 | Akoum | H04L 43/026 |
| 2017/0235848 | A1* | 8/2017 | Van Dusen | H04L 41/04 705/12 |
| 2017/0269911 | A1* | 9/2017 | Barsness | G06F 17/30516 |
| 2017/0279547 | A1* | 9/2017 | Hu | H04B 7/0413 |
| 2017/0300862 | A1* | 10/2017 | Bhadouria | G06Q 10/1053 |
| 2018/0129535 | A1* | 5/2018 | Carteri | G06F 9/505 |
| 2018/0136994 | A1* | 5/2018 | Toledano | G06F 11/079 |

OTHER PUBLICATIONS

Ericsson Consumerlab, "Keeping Smartphone Users Loyal—Assessing the impact of network performance on consumer loyalty to operators", An Ericsson Consumer Insight Summary Report, Jun. 2013, 12 pp.

Olshefski et al., "ksniffer: Determining the Remote Client Perceived Response Time from Live Packet Streams", *Proceedings fo the Sixth Symposium on Operating Systems Design and Implementation (OSDI 2004)*, San Francisco, CA, Dec. 6-8, 2004.

First Office Action and Search Report for Chinese Application No. 201380081413.0, dated Aug. 30, 2018, 7 pages.

* cited by examiner

Fig. 2
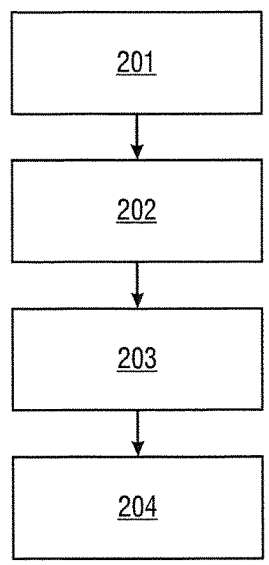
Fig. 3A
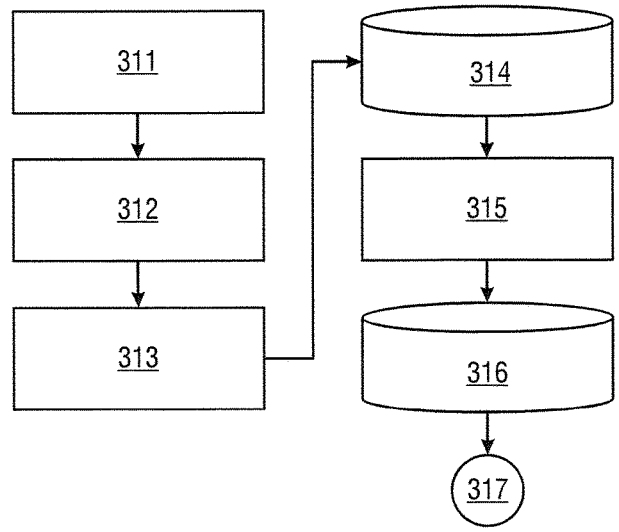
Fig. 3B
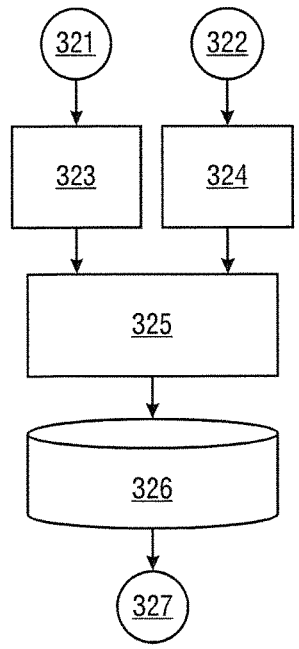
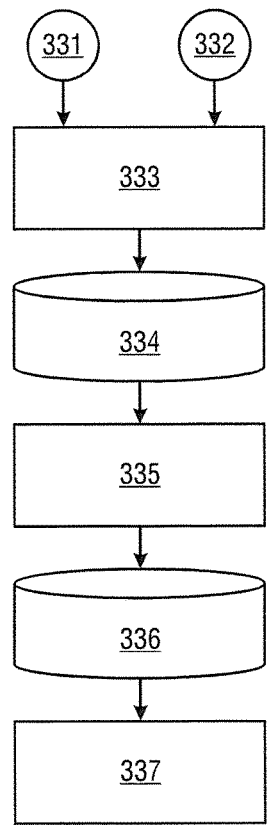
Fig. 3C

PERFORMANCE METRIC OF A SYSTEM CONVEYING WEB CONTENT

CROSS REFERENCE TO RELATED APPLICATION

This application is a 35 U.S.C. § 371 national stage application of PCT International Application No. PCT/EP2013/075363, filed on Dec. 3, 2013, the disclosure and content of which is incorporated by reference herein in its entirety. The above-referenced PCT International Application was published in the English language as International Publication No. WO 2015/081988 A1 on Jun. 11, 2015.

TECHNICAL FIELD

The present invention relates to obtaining a performance metric in a system for conveying web content from a server node to a terminal node. Specifically, the present invention relates to corresponding methods, network entities, computer programs and computer program products. More specifically, the present invention relates to obtaining the performance metric from web content record extracted by inspecting a data flow transmitting the web content.

BACKGROUND

The use of the world wide web (WWW) has become an everyday activity all over the world. Usually, web users access web content as so-called web pages by specifying a corresponding address in some kind of user terminal node, such as a stationary, mobile or tablet computer or a mobile phone with corresponding web access capabilities. Conventional user terminal nodes may feature one or more applications (software) for accessing web pages, e.g. in the form of so-called browsers. These browsers handle the request for specified web content and the content's display to and interaction with the user.

Web content is usually organized in the form of web pages that can be individually addressed and accessed by specifying their respective web addresses. One common way for addressing web pages is the definition of locations where the corresponding content is stored. The internet with its so-called internet protocol (IP) provides the related IP addresses that are intended to identify one unique storage location. Since such IP addresses are in the form of several tuples of numbers, they are difficult to memorize and are usually not suitable for everyday public use. However, there exist the concept of the so-called domain name servers (DNS) that can translate plain text addresses into their associated IP address. In this way, there is an easy means available for accessing a web page by associating its content to a plain text address, such as "www.nasa.gov".

The data objects related to the web content, e.g. all the text, image and multimedia files of one web page, are usually stored on one or more server node, which convey the related resources to the requesting terminal node along one or more network nodes. Here, the latter mentioned network nodes stand for all the infrastructure that is involved for conveying the requested content from the server node to the terminal node. This infrastructure may include switching and routing nodes of local area networks (LAN), the internet, gateways and access nodes on the user's end, like ADSL nodes or mobile communication networks with their base station nodes (eNBs) and possibly also relay nodes. In general, there is usually a number of individual network nodes of one or more domains that handle the data traffic toward the user's end and thus convey the web content toward the terminal node.

The aforementioned network nodes are usually under control and responsibility of one or more service providers, such as the operators of regional, national, or international internet domains, a network for serving the last mile toward the users (e.g. ADSL), or mobile telecommunication networks, in case the user accesses the web content from a mobile terminal node, such as a smartphone. Usually, the users subscribe the access service from an operator who, in exchange to the user paying a fee, provides access to web content from corresponding terminals, e.g. from the user's smartphone.

The involved operators and service providers usually compete for delivering web access service to users, in the sense that users usually have a choice amongst several service providers with the consequence that a user may change the service provider if the user experiences the provided service as in dissatisfactory. Hence, from an operator's or service provider's point of view, it should be desirable that the network provides a reasonably good web quality of experience (QoE) to their subscribers. As a consequence, the satisfaction with network performance can be quite a significant factor as regards user loyalty. In order for network performance to be perceived by users as "good quality", network operators may want to ensure that web pages loads quickly—at a speed considered reasonable within that market. Anything slower than this may disappoint users, so that they may opt for changing the provider.

In general, as seen from an end user perspective, the quality of a web session may be highly dependent on the time needed to download the requested page that is also referred to as the so-called Page Load Time (PLT). If the PLT is too long, the user will note this as unsatisfactory and long delays may even to be found as unacceptable. For example, a response delay of 1 second is the limit for user's flow of thought to stay uninterrupted. For mobile applications, it was found that the user's visual attention may shift away after 4 to 8 seconds. A response time of about 10 may be regarded as a limit and after that the response is experienced as negative and the maximum for an acceptable waiting time is in the order of 15 to 20 seconds. Ideally the download time would be reported directly from the terminal node (i.e. user terminal), as it is only the user terminal that really knows what objects and resources belong together, and when a full page has been downloaded. However, such client reporting is impractical and thus normally not available, especially for the case of Communication Service Providers (CSPs, providers). Reports available to server owners, browser vendors or even to CSPs usually employ an installed application that reports performance-related figures.

However, even if network operators and service providers may be aware of the need to observe user satisfaction, there are technical obstacles as far as the availability of relevant information is concerned. In the conventional arts, there are no systems and methods at hand that would provide a rapid identification of the reasons behind slow web sessions passing through a multi-domain network (core, radio, backhaul and service domains) of the involved network nodes between a server node and the requesting terminal node, i.e. on an end-to-end basis.

There is therefore a need for improved techniques for obtaining a performance metric in systems conveying web content from a server note to a terminal node along network nodes. Specifically, there is also a need for allowing the identification of the cause of unsatisfactory system performance yielding low user QoE, since knowledge about the cause allows operators and providers to react and take the appropriate measures for restoring and maintaining satisfactory user QoE.

SUMMARY

The above-mentioned objects and problems are solved by the subject matter of the independent claims. Further preferred embodiments are defined in the dependent claims.

According to one aspect of the present invention, there is provided a method of obtaining a performance metric in a system for conveying web content from a server node to a terminal node along one or more network nodes, the method comprising the steps of inspecting a data flow transmitting said web content toward the terminal node for extracting web content records; correlating said extracted web content records to at least one web session; associating said extracted web content records to a performance of one or more of said nodes; and calculating the performance metric from the correlated and associated web content records for at least one web session and one or more of said nodes.

According to another aspect of the present invention, there is provided a network entity for obtaining a performance metric in a system for conveying web content from a server node to a terminal node along one or more network nodes, the network entity comprising a processing resource configured to inspect a data flow transmitting said web content toward the terminal node for extracting web content records; correlate said extracted web content records to at least one web session; associate said extracted web content records to a performance of one or more of said nodes; and to calculate the performance metric from the correlated and associated web content records for at least one web session and one or more of said nodes.

According to further aspects of the present invention, there are provided related computer programs and computer program products.

BRIEF DESCRIPTION OF THE DRAWINGS

Embodiments of the present invention, which are presented for better understanding the inventive concepts and which are not the same as limiting the invention, will now be described with reference to the figures in which:

FIG. 2 shows a flow chart of a method embodiment of the present invention;

FIGS. 3A to 3C show flow charts of further method embodiments of the present invention;

DETAILED DESCRIPTION

Figure 1A:
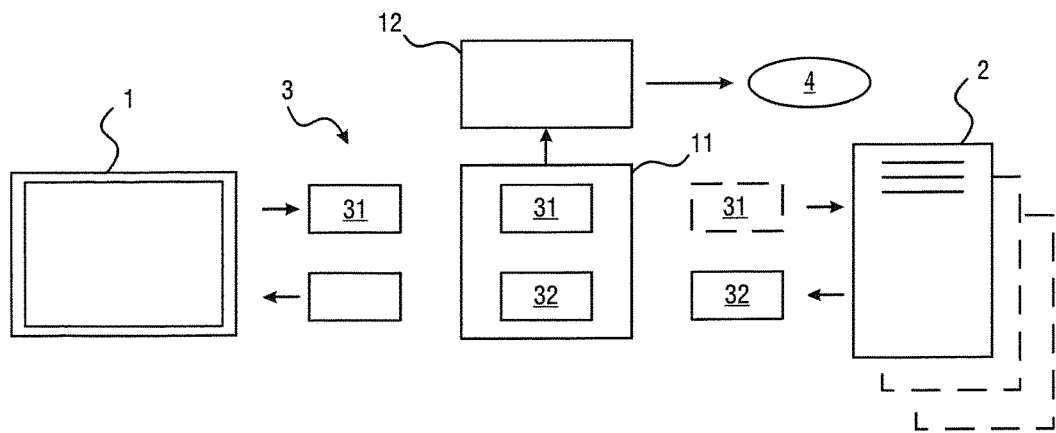
FIGS. 1A and 1B show schematic views of obtaining a performance metric in system configurations for conveying web content according to embodiments of the present invention.

FIG. 1A shows a schematic view of obtaining a performance metric in a system configurations for conveying web content according to an embodiments of the present invention. The shown system involves a terminal node 1 configured to access web content in the form of web pages, downloads, audio/video streams, remote application access, and the like. The terminal node 1 may take one of many common forms, including PCs, laptop computers, tablet computers, mobile phones, smartphones, and the like. Usually, a browser application (software) is executed with the processing and memory resources of the terminal node 1. This browser software presents on a user interface of the terminal node 1 the content of the web page in form of text, images, graphic elements, animations, sound/music, and the like. By means of the operation elements of the terminal node 1, the user can interact with the web content including scrolling the field of view of the web page, magnifying or downscaling of the displayed content, and selecting links that may lead to other parts of the same web page or to other web pages. Common input means include keyboards, mice and other pointing devices, touch screens, and the like.

The corresponding data of the web content originate from a server node 2, wherein said server node 2 can likewise take one of many forms, for example the one of an individual computer that comprises corresponding processing, communication, and memory resources for storing and delivering the respective web content on request. However, server node 2 may also take a form configured as virtual machine (VM) running on dedicated and/or distributed hardware resources of a data center. Of course web content can also be stored in a distributed fashion in the sense that server node references one or more other nodes for delivering other parts of the requested web content, or optionally on more than one server node as indicated by the broken lines behind node 2.

According to this embodiment, the terminal node 1 requests web content in the form of, for example, accessing a web page that has an address pointing to server node 2. In response, server node 2 conveys the content of the web page to the terminal node 1 where the corresponding application (browser) processes the received information and displays, plays back, or—generally—renders the content to the user. The user can then interact and the browser software can again contact server node 2 or other servers in response to the users' actions and requests.

Generally, the data and information exchanged by the terminal node 1 and server node 2 is handled by a communication channel 3 comprising all the involved network nodes and the respective links there in between. Usually, channel 3 involves the internet and one or more access networks toward the respective sites of the terminal node 1 and the server node 2. These access networks may comprise local area networks (LAN), wireless local area networks (WLAN), asynchronous digital subscriber line (ADSL) networks, mobile communication networks, such as LTE, UMTS, GPRS, GSM, PCS, and related networks.

Each involved network, network node or subpart of the communication channel 3 may employ its own techniques, routers, and protocols for conveying data. However, there is usually some kind of common high level protocol defining in some way or another, data units 31, 32. In the example of the internet protocol IP, these data units 31, 32 are usually referred to as so-called packets. Each of these data units (packets) includes header data for allowing correct routing of the unit/packet within the given network and, of course, the payload data that conveys some part or all of the respectively requested web content.

Usually, a web session is initiated by requesting some web content (e.g. specifying an address of a web page and instructing a browser to access, retrieve, and display the web page). In response, the responsible server node 2 provides the data and information that is associated with the requested web content/page. In general, data units/packets that originate from the terminal node 1 are denoted by reference numeral 31, and data units/packets destined to the terminal node 1 are denoted by reference numeral 32. In the shown example of FIG. 1A, therefore, the web session may be initiated by sending a request in form of one or more data units/packets 31. The responsible server node 2 answers and provides the content in the form of data units/packets 32.

Along the present embodiment, inspection means 11 are provided for inspecting the data flow transmitting the web content toward the terminal node. Specifically, these inspection means 11 analyze the data exchanged between terminal node 1 and server node 2 for extracting web content records that allow identification/estimation of a transmission time, requesting time, a node handling the data on the way toward the inspection means 11, and the like. More specifically, this analysis may take place on a data unit/packet level so that one or more individual data unit/packet(s) 31/32 are analyzed. For example, packet 31 travels from the terminal node 1 to the server node 2 comprising a request for a specific web page being located (stored) at server node 2. In response, server node 2 conveys the content as one or more packet(s) 32 to the terminal node 1. Examples for implementing the inspection means 11 for inspecting the data flow for extracting web content records include the technique of so-called deep packet inspection (DPI).

The extracted web content records are forwarded to a processing entity 12 that is configured to correlate the extracted web content records to at least one web session. In other words, the extracted records are correlated on a user basis, which can be effected by considering the sender IP addresses from packets 31, and/or the destination IP addresses of packets 32. Since the IP address of one terminal node 1 may change over time—even during one session—this process may involve consulting address change logs that allow for tracing the varying IP addresses for one same terminal node 1.

The processing entity 12 is further configured to associate the extracted web content records to a performance of one or more nodes involved in the web session. For example, an extracted web content record is associated to the performance of the server node 2, when the record shows some information on when it was received by server node 2 or when the record was transmitted from the server node 2. Following this example, both such records can be employed for estimating the response time of the server node 2 assuming that the record indicating when it was received by node 2 is involved with a request of a web resource, and the record indicating when it was transmitted by node 2 is involved with sending the requested web resource. The two times can be taken for calculating a response time of the server node 2 that it required to access and provide the requested resource. If this time exceeds a threshold the server node 2 can be identified as a cause for unsatisfactory user QoE. The aforementioned threshold can be defined by one or more of the reference values that are described in greater detail in conjunction with other embodiments.

Generally, the processing entity 12 is further configured to calculate a performance metric from the correlated and associated web content records for at least one web session and one or more of said nodes. Whilst the above-mentioned server access time is surely one possible performance metric in a system for conveying web content, there are certainly many alternatives and the term performance metric is to be understood as referring to any metric (e.g. figure) that can provide an assessment of the performance of the one or more nodes under consideration.

Moreover, in the context of the present disclosure, the term "node(s)" refers to any one of the terminal node, the server node, and the one or more nodes involved in conveying the web content between the endpoints (terminal node and server node). As a consequence, the term "web content" does not only refer to the resources (text, image, media files) that are conveyed toward the terminal node but also the corresponding requests and possibly also uploads (again, text, image, or media files) in the opposite direction from the terminal node to the server node. The obtained performance metric, figures representing that metric, or reports based on the obtained metric(s) can be the output as data 4 in any suitable form as requested by the operator/provider.

Figure 1B:
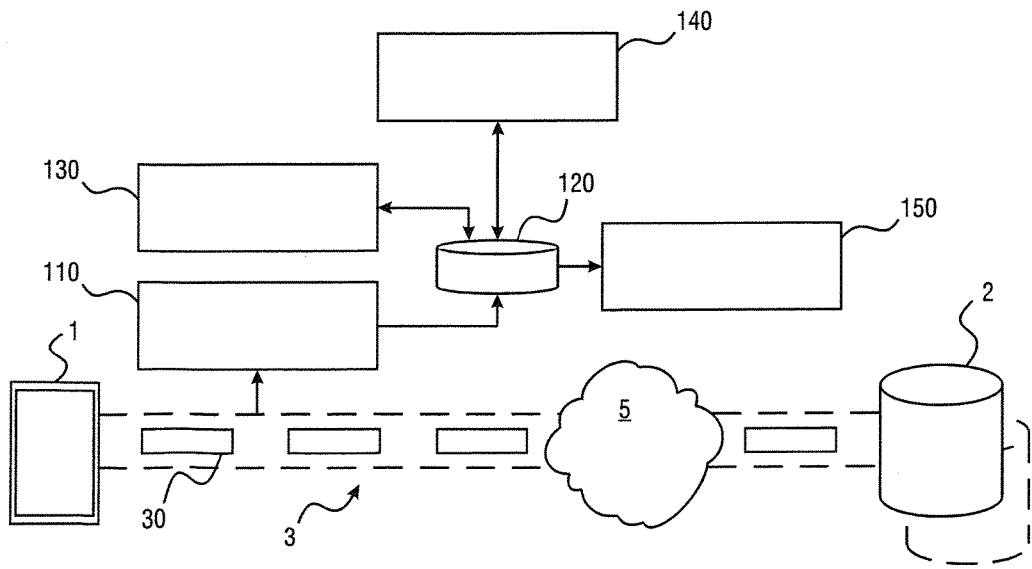

FIG. 1B shows a schematic view of obtaining a performance metric in an alternative system configuration for conveying web content according to another embodiment of the present invention. Similarly to the configuration as described in conjunction with FIG. 1A, the system involves a terminal node 1 that accesses web content on a server node 2 via a communication path 3 and a packet data network 5 (e.g. internet or LAN of a data center), wherein the latter will comprise all the so-called network nodes that handle the traffic. Packets 30 are exchanged by the terminal node 1 from and to the internet 5.

In this embodiment, the system comprises a web session mining module 110, which captures HTTP packets 30 passing through a provider's network via passive probe. After analyzing HTTP headers, which are the extracted records, it stores various statistics about web session downloads into a web data store system 120. The system also comprises a web statistical reference module 130, which is configured to read the web session statistics from web data store 120, and to compute reference values for various web download metrics, including, for example, a Transmission Control Protocol (TCP) setup time, a server access time, a client processing time and/or a resource download time.

These mentioned times are embodiments for the performance metric of the one or more corresponding node. Specifically, the client processing time can be calculated from extracted records (headers) being associated to the performance (i.e. the processing performance of a terminal node 1. The TCP setup time can be calculated from extracted records being associated to the performance (time to set up a TCP connection) of a group of nodes (i.e. one or more network nodes) that handle the TCP connection. The server processing time can be calculated from records being associated to the performance (processing) of server node 2, and the resource download time can be calculated from records being associated to the performance (time required to transmit data) of all the nodes (i.e. one or more nodes) involved in getting the resource to the terminal node 1.

The system further comprises a web session analytics module 140, where all web sessions are analyzed in detail using a waterfall diagram. In particular, a reference page loading time PLT (PLT_allgood) for each session can be computed based on the reference values computed by modules 110 and/or 130. Module 140 may also compute the PLT overhead from the different sources, namely T_tcp, T_client, T_server and T_download. Also, the web session analytics module 140 may take stored reference values for the web sessions information, and compute i) the reference value for the PLT and ii) the overhead from each source namely TCP setup, server access, resource download and client processing, for each web session.

The system further comprises a web root cause analytics module 150 which attempts to identify potential root causes for poorly performing web sessions. The potential root causes include client, server, TCP setup, and resource download. The module can run a configurable rule-based engine where symptoms related to the PLT overhead from the different sources computed by other modules can be mapped to root causes. Multiple hierarchical root cause layers can also be configured.

The mentioned HTTP (hypertext transfer protocol) is currently the main application protocol used to transport web content (pages). It runs on top of TCP and is usually a request-response protocol. If HTTP pipelining is used, then a request can be sent before the complete response to the previous request has been received. However, due to interoperability problems this functionality is not commonly implemented. This means that the client (terminal node) sends requests and waits for a complete response to be received before it sends the next request using the same TCP session. Thereby, one web page may consist of many different resources (or objects), such as HTML, images, JavaScript, CSS, Flash, etc. The request of a single web page hosted in a single server node using a single TCP session is shown in both FIGS. 1A and 1B by the exchange of packets 30, 31, 32. Specifically, one of the packets 31 shown in FIG. 1A may carry the request to server node 2, whereas one or more packets 32 carry the response to the requesting terminal node 1. Typically, the resources may also be distributed over several different server nodes. Furthermore, browsers may typically open multiple TCP sessions to the same server node to improve parallelism and improve transfer speeds.

The mentioned web root cause analytics module 150 may apply multi-layer configurable root cause analysis (RCA) rules on the data from the store 120 (e.g. as saved in step 336 explained below) and computes one or multiple RCA attributes associated to each web session. For this purpose module 150 may comprise a first layer Web RCA rule engine accessing relevant data from store 120 with one of the data structures as explained below. The data can be selected according to a configurable criterion (e.g. QoE value='BAD'), running configurable RCA rules as a function of the PLT information per session and classifying the root causes of the PLT overhead per session as being caused by:
  a. DOWNLOAD,
  b. TCP_SETUP,
  c. CLIENT,
  d. SERVER,
  e. Or any combination of these issues.

The classified sessions can then be stored back to store 120 in a suitable data structure comprising one or more of the following items: PLT, PLT_allgood, T_client, T_server, T_tcp, T_download, Page ID, QoE, Root_cause, and the like.

In a first embodiment, the absolute values of the overhead from the above four or more sources are compared to each other and the one with the maximum overhead is selected as the root_cause. This root cause classification is added as a new field in the previous data structure having the web session records. As an example, the following rule shown below can be configured:
  IF (T_Client==max(T_Client, T_Server, T_Tcp, T_Download) THEN root cause='CLIENT'
  ELSE IF (T_Server==max(T_Client, T_Server, T_Tcp, T_Download) THEN root cause='SERVER'
  ELSE IF (T_Tcp==max(T_Client, T_Server, T_Tcp, T_Download) THEN root_cause='TCP_SETUP
  ELSE IF (T_Download==max(T_Client, T_Server, T_Tcp, T_Download) THEN root_cause='DOWNLOAD'

In a second embodiment, the value of the overhead from the four above or more sources are compared to the PLT in relative terms and, based on this comparison, one or multiple overhead root causes of each selected web session can be defined. This root cause classification is added as a new field in the previous date structure having the web session records. As an example, the following rule can be defined:
  IF T_Client/PLT>Y1% THEN root_cause.append('CLIENT')
  IF T_Server/PLT>Y2% THEN root_cause.append ('SERVER')
  IF T_Tcp/PLT>Y3% THEN root_cause.append ('TCP_SETUP')
  IF T_Download/PLT>Y4% THEN root_cause.append ('DOWNLOAD'),
  Wherein the threshold Yi % (with i=1, 2, 3, 4) in substance indicates the percentage of how much of the PLT comes from a given overhead (source).

In a third embodiment, the absolute value of the overhead from the dour above or more sources are compared to configurable thresholds y1, y2, y3 and y4, as shown in the following example:
  IF T_Client>y1 seconds THEN root_cause.append('CLIENT')
  IF T_Server>y2 seconds THEN root_cause.append ('SERVER')
  IF T_Tcp>y3 seconds THEN root_cause.append ('TCP_SETUP')
  IF T_Download>y4 seconds THEN root_cause.append ('DOWNLOAD')

The thresholds yi (with i=1, 2, 3, 4) may be configured for different ranges of web page size. In summary, the web root cause analysis module receives a rules configuration and/or a codebook definition and reads a data structure comprising one or more of the following field from the data store: PLT, PLT_allgood, T_client, T_server, T_tcp, T_download, Page ID, QoE. This data structure is appended by the result field, e.g. named "Root_cause", indicating the root cause identified by the module. The appended data structure can then be written back to the data store (web data store system).

The above-mentioned RCA methods are typically taken from the field of control theory, more specifically from the so-called integrated diagnostics systems. Thereby, the main task of a RCA method can be identified as the mapping of observable symptoms to root causes. As an example related to the context of the present disclosure, one may consider a slow web session, where a "large PLT overhead from client processing" could be defined as a symptom and its associated root cause could be "terminal with bad processing power". By having this modeling knowledge, when the system receives a new session record as input with a similar symptom, it would classify the root cause as "terminal with bad processing power".

One of the approaches to perform RCA, highlighted in the previous example, is the mentioned use of a rule engine. Each rule is basically performing the mapping between a set of observable symptoms to the root cause or potential root causes which can feed a second level rule-engine with different observable symptoms. This rule-based approach is sometimes called a codebook-based approach, since the rules can be organized in a sort of codebook of symptoms and root causes. However, different symptoms may be caused by multiple root causes. In addition to this, in order to define a symptom/problem model (codebook), domain knowledge may be needed, starting from the way the observables and symptoms are defined. One of the advantages of embodiments of the present invention is the potential of being an enabler to a proper flexible codebook design where the observables are based on the PLT overhead caused by different sources.

More specifically, root cause analysis of web sessions experiencing slow PLT can be performed in two different perspectives. The first one comes from web site owners who want their visitors to have the best possible performance in terms of PLT given the same network/computing conditions. The other perspective comes from providers/operators who want to guarantee a reasonable web QoE for its subscribers. Both web site owners and providers/operators may be interested to know the reasons behind sessions with slow PLT in order to perform some action in their domain which might improve the performance. Web site owners can apply techniques to make the web content-transfer faster, wherein most of them are related to the frontend optimization (e.g. the re-organization of the HTML base file). On the other hand, providers/operators may try to influence the web PLT by tuning network parameters, changing subscribers' policies or, in some cases, replacing bad performing nodes or reconfiguring routing schemes along involved network nodes. In both perspectives, the challenge may be to find the root cause of problems and using the possibilities in its own premises to improve the PLT performance, which can be substantially facilitated by the embodiments of the present invention.

The mentioned web statistical reference module 130 may retrieve the relevant data from data store 120 (e.g. the structure as saved in step 316 described below) and produces corresponding output by appending for each contribution the lists associated to all the web sessions. The module 130 may then take the output data structure as input from the web data store, and computes reference values for the TCP Setup Time, the Server Access Time, the Client processing time and the Resource Download time, i.e. for the desired performance metrics.

In a first embodiment, the reference value of TCP setup time can be set to the 10th percentile computed from the distribution of the TCP setup times of all TCP connections of all the sessions whose information is stored. In a second embodiment, the reference value of server access time is set to the 10th percentile computed from the distribution of the server access times of all the accessed servers associated to all the sessions whose information is stored. In a third embodiment, the reference value of client processing time is set to the 10th percentile computed from the distribution of the Client processing times of all the object pairs associated to all the sessions whose information is stored. In a fourth embodiment, the reference value of Resource download time is set to the 10th percentile computed from the distribution of the resource download times of all the objects belonging to the same size range, also called classes. In a fifth embodiment, instead of the 10th percentile of the distributions of the metrics, the median may be used as the reference values associated to the metric. The output reference values from web statistical reference module can then be again stored.

FIG. 2 shows a flow chart of a general method embodiment of the present invention. Specifically, this general method embodiment can be implemented with the system configurations as for example shown and described in conjunction with FIGS. 1A and 1B. In this way, such configurations implement a system for conveying web content from a server node to a terminal node along one or more network nodes, and the general method embodiment is for obtaining a performance metric for one or more nodes of that system. The general method embodiment comprises a step 201 of inspecting a data flow transmitting web content toward the terminal node for extracting web content records, and a step 202 of correlating the extracted web content records to at least one web session. In step 203, the extracted web content records are associated to a performance of one or more of said nodes, and in step 204 the performance metric is calculated from the correlated and associated web content records for at least one web session and one or more of said nodes.

FIGS. 3A to 3C show flow charts of further method embodiments of the present invention. These embodiments may specifically apply to the configuration as shown in FIG. 1B. FIG. 3A describes a basic method sequence of these further method embodiments and comprises a step 311 of collecting headers of HTTP request, e.g. via passive probes (DPI). In this way, web usage data can be collected passively using DPI. The data can consist of headers (extracted records) from HTTP requests and associated TCP headers associated with the transmission of each single web resource in a given provider's network. For each web resource going through the probes, a data record can be created including URL, referral header, resource size, TCP setup time, server response time and download time.

In step 312, a web page ID is added to each web resource record associated to a given web session, and in step 313 web resource records are created with relevant information from HTTP and TCP headers. In this way web resource downloads are grouped into web page session records and these records are stored in step 314 in a data store system. The outcome of this may be represented as a data structure comprising one or more of the following items:

Page ID: The unique ID for a given web session
Server host: Server host or domain name
Server IP: The IP address of the server hosting the object
URL: The URL of the resource
HTTP referrer: The HTTP referrer header of this resource
Resource size: The size of the resource in bytes
TCP connection index: An index indicating which TCP connection is carrying this resource
Start timestamp: The time when the first SYN segment (or HTTP request packet if the TCP session is reused) is detected at the passive probe
TCP setup timestamp: The time when the first ACK segment from the server is detected at the probe
Server access timestamp: The time when the first HTTP data packets sent from the server is detected at the probe
Download timestamp: The time when the ACK segment for the last data packets for a resource is detected at the probe Specifically, the above data structure stored in step 314 can be obtained by the web session mining module 110 capturing HTTP packets (Requests/Responses) via passive probing and creates a record for each web resource (object) that has been downloaded to the client. In addition, by analyzing the HTTP referrer header, it groups various resources into a web page sessions. For each web resource, a record containing one or more of the above attributes is stored in step 314 into the web data store 120.

From the stored data, one or more of modules 120, 130, and 140 can compute one or more of the following performance metrics in step 315 associated for each web session: i) a TCP setup time which is the time it takes for the client (terminal node) to setup a TCP connection to the server node. The time from the first SYN segment until the first ACK segment can be measured. This metric can be defined per TCP connection for the web session. ii) Server access time which is the time it takes for the server node to produce a response for a resource request sent by the terminal node.

The time from the first resource request packet to the first packet containing data sent by the server after it has received the request can be measured. iii) Resource download time which is the time it takes to download a resource. The function measures the time from the first data packet in the response until the whole response has been acknowledged by the client. This measure may depend on the resource size and the available bandwidth. iv) Client processing time which is the time needed by the web browser (running on the terminal node) to parse and interpret HTML, Javascript, and CSS before it has determined which resources to download next. This "thinking time" is captured in the client processing time. For each web resource, the client processing time is the thinking time gap to the resource prior to it in the same TCP connection. If a resource is the first resource in a TCP connection, then it is the time gap to its parent resource based on the HTTP referrer.

Any results of step 315 are then stored in step 316 in another data structure comprising one or more of the following items:

Page ID: The unique ID for a given web session

Server Access Time List: [s(1), . . . , s(M)] where M is the number of HTTP requests of that given web session TCP Setup Time List: [t(1), . . . , t(K)] where K is the number of TCP connections for that given web session Client Processing Time List: [c(1), . . . , c(N)] where N is the number of resource pairs in the given web session Resource Download Time List: contains the download time for all the resources and their size, e.g. of a given web session.

Hence, step 315 may compute from the data structure stored in step 314 one or more of the performance metrics per web session, such as the client processing time for each pair of web resources downloaded in the same web session, the TCP setup time for each of all TCP connections in the same web session, the server access time and for each of all resource requests in the same web session, the resource download time for each of all resource requests in the same web session. At point 317 the method may continue with further steps as they are described in conjunction with FIGS. 3B and 3C.

FIG. 3B shows a flow chart of a further method embodiment of the present invention which starts from point 317 shown in FIG. 3A. From there, the method may continue either at point 321 or at point 322. In step 323, the hitherto computed list is appended by accounting for all web sessions in the network as shown (i.e. all sessions of a given time span or sub-network). Specifically, one or more of the following lists can be computed in step 323:

clientProcTime=[c(1), c(2), . . . , c(N)], where N is the overall number of object pairs for all the web sessions going through the network;

tcpSetupTime=[t(1), t(2), . . . , t(K)], where Kp being the number of TCP connections associated to the p-th session and K=K1+ . . . Kp is the overall number of TCP connections of all the web sessions, serverAccessTime=[s(1), s(2), . . . , s(M)], where M= M1+ . . . +Mp is the number of requested objects for all the web sessions for Mp being the number of requests for the p-th session.

Alternatively, in step 324, one or more of the following lists can be computed:
rscDownloadTime_bin1=[r(1), . . . , r(M1)],
. . .
rscDownloadTime_bin10=[r'(1), . . . , r'(M10)],
where download time samples can be filtered per resource size range. Thus, there might be one list per resource size range. For a set of P range intervals, we may have for the p-th range M_p objects. More specifically, the times can be sorter or categorized for each one of a set of size ranges (so-called "bins"). If one assumes a minimum size of an object as MIN and the maximum as MAX, a full range of [MIN; MAX] would cover all appearing objects. Then, N bins can be defined of, for example, equal size, with ranges corresponding to a bin size=MAX--IN/N. Then, an object with size within each of these intervals will be considered as part of the bin and would be accordingly categorized. The above identifier rscDownloadTime_bini thus refers to the list of all objects falling into bin i. In other words, there can be one list per metric, except for the resource download time, where there can be one list per size range. In the shown example, there are 10 bins, one for each size range. M1 is the number of samples (objects) in the first range.

In step 325, the distributions (lists) built in the previous step are analyzed via a statistical method. In particular, reference values can be computed for each of the metrics client processing time, server access time, TCP setup time. Then each web resource can be classified based on the size range of a given resource e.g. from 1 to 10. For each classification, the list of resource download time namely rscDownloadTime–bin1=[r(1), . . . , r(M1)], . . . , rscDownloadTime–bin10=[r'(1), r'(2), . . . , r'(M10)] can be appended. These lists with the distributions can be stored as a data structure comprising one or more of the following items:

tcpSetupTime: [t(1), t(2), . . . , t(K)], where K is the number of TCP connections of all the web sessions;

serverAccessTime: [s(1), s(2), . . . , s(M)], where M is the number of requested objects of all the web sessions;

clientProcTime: [c(1), c(2), . . . , c(N)], where N is the overall number of object pairs of the same session;

rscDownloadTime1: {r1(1), r(2), . . . , r1(M_1)};

rscDownloadTimeP: {rP(1), rP(2), . . . , rP(M_P)}.

Step 325 also analyzes the distributions built in the previous step via a statistical method. In particular, computing reference values for each of the lists i.e. for each bin size. The results are then stored in step 326 in a data structure comprising one or more of the following items:

Download Resource time reference values
Class 0-10K 1 s
Class 10K-30K 2 s
. . .
Class 900K-1000K 4 s
TCP Setup Time reference values
Server Access Time reference values
Client Processing reference values The method may then continue at point 327 with one or more steps as described in conjunction with FIG. 3C.

FIG. 3C shows a flow chart of a further method embodiment of the present invention which starts from point 317 shown in FIG. 3A at point 331 or from point 327 shown in FIG. 3B at point 332. From there, in step 333 a reference value for the PLT is computed for each web session i.e. what the PLT would have been if the components would be reduced to their reference values. The computation of the reference value for the page load time (PLT) for each recorded web session can be effected by reducing the contribution of each component in of data structure stored in step 316 to their reference values. The PLT reference value can be denoted by PLT_allgood.

In addition to PLT_allgood, the module can also compute further metrics such as T_client, T_server, T_tcp, T_download, which are the overhead in the PLT caused by different sources. To compute a metric T_tcp, it computes what the PLT would be if all other components (Client, server, and resource download) are reduced to the references values, while TCP setup time is kept unchanged. Taking the difference of this PLT with PLT_allgood, one can obtain T_tcp, which specifics the overhead in the PLT caused by TCP setup. In a similar way, other metrics (T_client, T_server, T_download) can be computed. In step 334, these values are stored, associated to each web session, as a data structure comprising one or more of following items:

Page ID;

PLT: The real PLT for a given web page session. This is from the start of the first resource to the end of the last resource;

PLT_allgood: The PLT each web session would experience if the overhead from the four sources (Client, TCP Setup, Server and Download) would have been reduced to their reference values;

T_client: Overhead in the PLT caused by the Client processing compared to its reference value;

T_server: Overhead in the PLT caused by the Server Access compared to its reference value;

T_tcp: Overhead in the PLT caused by the TCP Setup compared to its reference value;

T_download: Overhead in the PLT caused by the Resources Download compared to its reference value per range size class.

In step 335, for each web session record the PLT overhead caused by each source is computed, including client processing, server, TCP setup procedure and resources download. The overhead from the i-th contributor can be assumed as the hypothetical PLT of that session if all other three contributions would have been reduced to their reference values, except for the i-th contributor. These results are stored in step 336, from which in step 337 potential root causes can be identified for problematic recorded web sessions. The potential root causes being associated to the sources of PLT overhead: client, server, TCP setup, and resource download. For example, a configurable rule engine can be applied to the processed data stored in step 336 and the root cause of poorly performing web sessions can be classified by source, e.g. as CLIENT, SERVER, TCP, DOWNLOAD, etc.

Figure 4A:
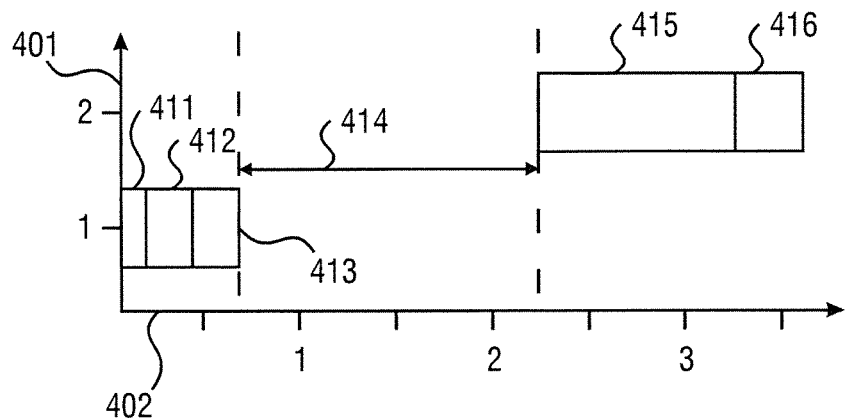
FIGS. 4A to 4D show schematic views of the composition and sequence of factors contributing to performance in systems for conveying web content.

FIG. 4A shows a schematic view of the composition and sequence of factors contributing to a performance metric. Specifically, FIG. 4A visualizes a computed metric for a given web session where the web page consists of two resources transmitted over a single TCP connection. Specifically the PLT is shown in time units along axis 402 for each resource under consideration along axis 401. A first resource is associated with a TCP setup time 411, a resource download time 412, and a server access time 413. Then the client processing time 414 follows, until a next second resource can be considered. Similarly, this second resource is associated with a resource download time 415, and a server access time 416. Naturally, a TCP setup time is no longer required for the second (follow-up) resource. It is to be noted that the shown contributions may be drawn exaggerated for illustration purposes.

Figure 4B:
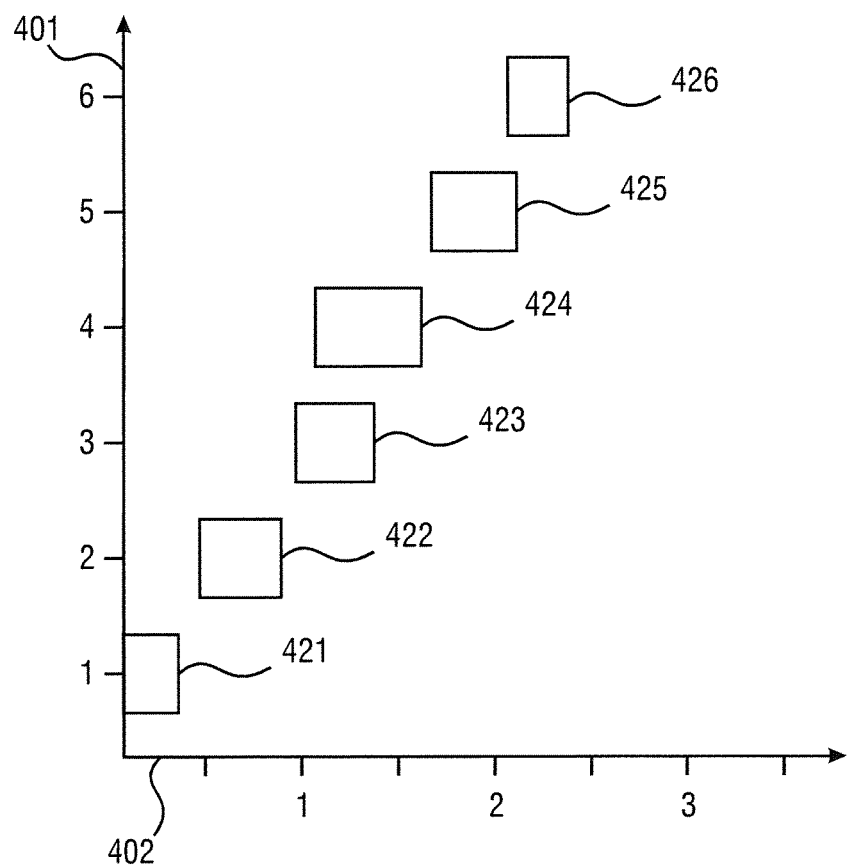
Figure 4C:
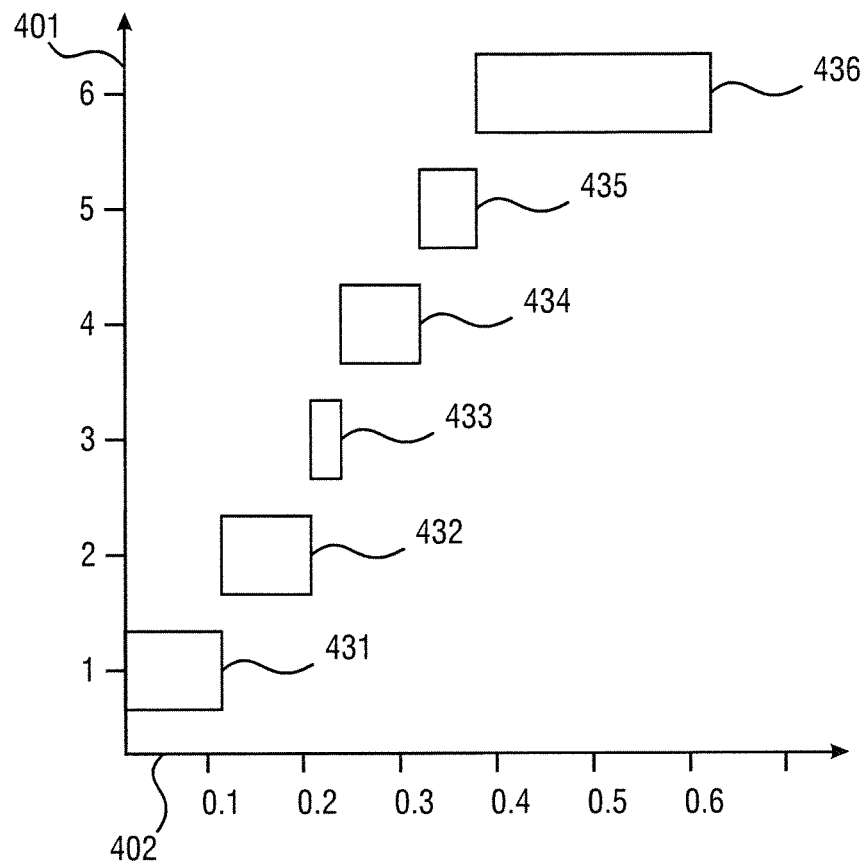

FIGS. 4B and 4C shows a schematic view of the composition and sequence contributing to a PLT. Specifically, a reference value for the PLT can be computed by fixing one-by-one all the sources of overhead i.e. client, server, TCP setup and resource download. Fixing in this context means reducing their contribution to their reference value as read, for example, from the stored date in step 326. In FIGS. 4B and 4C this process is illustrated graphically, where the graph of FIG. 4B represents the web session as it is and the graph of FIG. 4C represents the computation of the PLT_allgood. Specifically, reference numerals 421 to 426 refer to the sum of contributions (i.e. TCP setup time, server access time, and resource download time) for six resources coming to an end at approximately 2.5 time units (e.g. seconds). A comparison with the scenario PLT_allgood as shown in FIG. 4C shows that for all six resources the sums of contributions 431 to 436 come to an end already at approximately 0.65 time units (e.g. seconds).

Figure 4D:
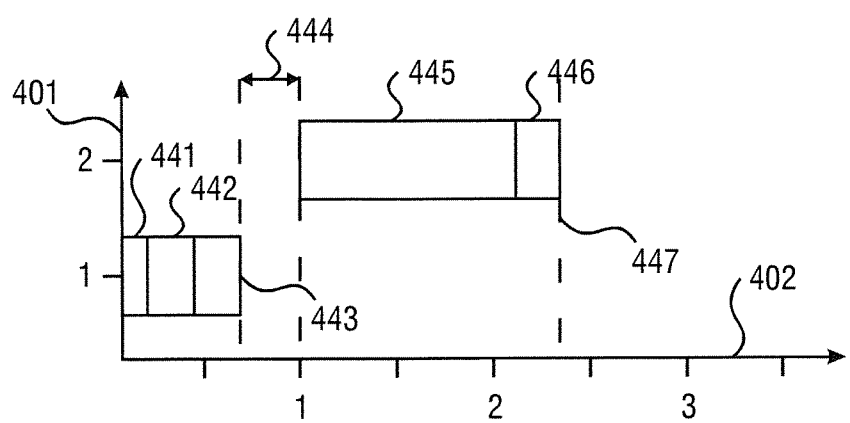

FIG. 4D shows a schematic view of the composition and sequence corresponding to that of FIG. 4A for the scenario PLT_allgood. As shown, contributions 441 to 447 already are completed at approximately 2.45 time units (seconds), considerably shorter as the more than 3.5 time units in the case of FIG. 4A.

Figure 5:
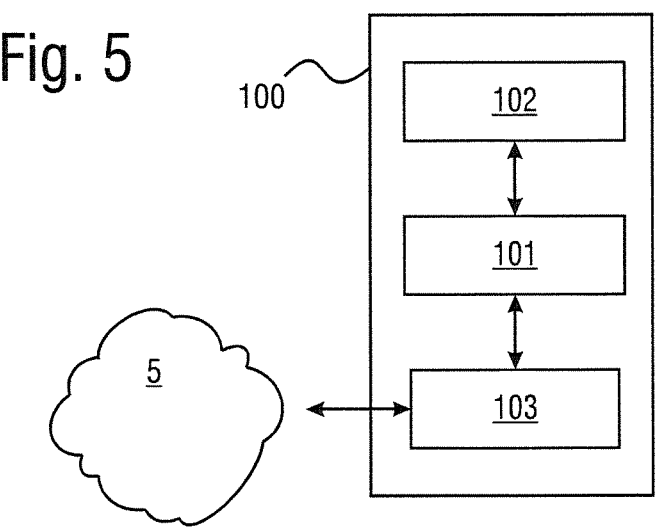
FIG. 5 shows a schematic view of an entity embodiment of the present invention.

FIG. 5 shows a schematic view of an entity embodiment of the present invention. This entity 100 comprises a processing resources 101, memory resources 102, and communication resources 103 for communication with a network 5. The latter may carry the web content subject to inspection. The memory resources 102 may store code for instructing the processing resources 101 to implement the steps of method embodiments of the present invention. More specifically, the memory resources 102 may store code that instructs the processing resources 101 to implement one or more of inspecting a data flow transmitting said web content toward the terminal node for extracting web content records; correlating said extracted web content records to at least one web session; associating said extracted web content records to a performance of one or more of said nodes; and calculating the performance metric from the correlated and associated web content records for at least one web session and one or more of said nodes.

One advantageous aspect of embodiments of the present invention may be identified that instead of installed applications probes are used, with an advantage that it does not rely on terminal reporting, which, in turn, has the disadvantage such reporting generates extra load in the network (for the reports) and relies on users to allow the installation of the corresponding application on their terminals. Embodiments of the present invention further provide a way for performing root-cause analysis of poor performing web sessions. The Web RCA methodology can be important for operators to identify sources causing poor web performance, and thereby improve the service performance to improve/keep the customer loyalty. In addition, new mobile broadband businesses could be created using the information mined and exposed by the methods of this invention.

More specifically, embodiments of the present invention may solve one or more of the following problems:

i) Problems related to the investigation of the root cause of poorly performing web sessions (in terms of PLT) when these target potential web page optimization and do not consider potential bottlenecks from the network or the client. Such solutions may however not provide any insight for provider (CSP) owners in terms of network-related issues. In contrast thereto, embodiments of the present invention can allow a web page designer to determine improvements that could be made to the web page.

ii) Problems associated with so-called web PLT prediction which employs simulating and adjusting the load times of web objects in a webpage to determine adjustments that optimize the overall PLT of the webpage. In contrast thereto, embodiments of the present invention propose the identification of bottlenecks in the web page rendering structure in order to point towards front end optimization.

iii) Problems associated with machine learning-based methods to map the PLT to web page related parameters such as the web page size, number of objects or the amount of specific type of content. Such solutions do not take into account effects caused by the client and the networks.

Although detailed embodiments have been described, these only serve to provide a better understanding of the invention defined by the independent claims, and are not to be seen as limiting.

The invention claimed is:

1. A method of obtaining a performance metric, in a system for conveying web content from a server node to a terminal node along one or more network nodes, the method comprising the steps of:
   inspecting a data flow transmitting said web content toward the terminal node for extracting web content records;
   correlating said extracted web content records to at least one web session;
   associating said extracted web content records to a performance of one or more of said nodes; and
   calculating the performance metric from the correlated and associated web content records for at least one web session and one or more of said nodes, wherein the performance metric is calculated by calculating a resource download time for conveying a resource to the terminal node for each of a plurality of resource requests in a same web session from records being associated to the performance of the one or more nodes involved in conveying the resource to the terminal node,
   wherein the method further comprises identifying a cause of low performance based on the calculated performance metric by
      computing a page loading time (PLT) overhead caused by each of a plurality of overhead sources;
      comparing absolute values of the PLT overhead of each overhead source with the PLT overhead of each other overhead source; and
      selecting a maximum PLT overhead associated with a particular overhead source as the cause of low performance.

2. The method of claim 1, wherein the calculating the performance metric is repeated to calculate a plurality of performance metrics, each performance metric being associated to one or more different nodes from group of the terminal node, the server node, and the one or more network nodes.

3. The method of claim 1, wherein a client processing time is calculated as one performance metric, said client processing time indicating a processing performance of the terminal node.

4. The method of claim 1, wherein a Transmission Control Protocol (TCP) setup time is calculated as one performance metric, said TCP setup time indicating a time to set up a TCP connection between the terminal node and the server node.

5. The method of claim 1, wherein a server processing time is calculated as one performance metric, said server processing time indicating a processing performance of the server node.

6. The method of claim 1, wherein the resource download time indicates a time required for conveying a resource to the terminal node along one or more involved network nodes.

7. The method of claim 1, wherein a performance metric is calculated based on two extracted records belonging to a same web session or is calculated based on each of all resource requests in one web session.

8. The method of claim 1, further comprising a step of building a list of associated performance metric values.

9. The method of claim 8, further comprising a step of analyzing the built list using a statistical procedure for calculating a reference value for a performance metric.

10. The method of claim 1, wherein the step of inspecting the data flow comprises a deep packet inspection procedure for extracting headers as said web content records.

11. A network entity for obtaining a performance metric in a system for conveying web content from a server node to a terminal node along one or more network nodes, the network entity comprising:
   a processor; and
   a memory coupled to the processor and storing program code that when executed by the processor cause the processor to:
      inspect a data flow transmitting said web content toward the terminal node for extracting web content records;
      correlate said extracted web content records to at least one web session;
      associate said extracted web content records to a performance of one or more of said nodes; and to
      calculate the performance metric from the correlated and associated web content records for at least one web session and one or more of said nodes, wherein the performance metric is calculated by calculating a resource download time for conveying a resource to the terminal node for each of a plurality of resource requests in a same web session from records being associated to the performance of the one or more nodes involved in conveying the resource to the terminal node,
   wherein the processor further caused to identify a cause of low performance based on the calculated performance metric by:
      computing a page loading time (PLT) overhead caused by each of a plurality of overhead sources;
      comparing absolute values of the PLT overhead of each overhead source with the PLT overhead of each other overhead source; and
      selecting a maximum PLT overhead associated with a particular overhead source as the cause of low performance.

12. The network entity of claim 11, wherein the calculation of the performance metric is repeated to calculate a plurality of performance metrics, each performance metric being associated to one or more different nodes from group of the terminal node, the server node, and the one or more network nodes.

13. The network entity of claim 11, wherein a client processing time is calculated as one performance metric, said client processing time indicating a processing performance of the terminal node.

14. The network entity of claim 11, wherein a Transmission Control Protocol (TCP) setup time is calculated as one performance metric, said TCP setup time indicating a time to set up a TCP connection between the terminal node and the server node.

15. The network entity of claim 11, wherein a server processing time is calculated as one performance metric, said server processing time indicating a processing performance of the server node.

16. The network entity of claim 11, wherein the resource download time indicates a time required for conveying a resource to the terminal node along one or more involved network nodes.

17. The network entity of claim 11, wherein a performance metric is calculated based on two extracted records belonging to a same web session or is calculated based on each of all resource requests in one web session.

18. The network entity of claim 11, wherein the program code when executed by the processor further causes the processor to build a list of associated performance metric values.

19. The network entity of claim 18, wherein the program code when executed by the processor further causes the processor to analyze the built list using a statistical procedure for calculating a reference value for a performance metric.

20. The network entity of claim 11, wherein the inspection of the data flow comprises a deep packet inspection procedure for extracting headers as said web content records.

21. A computer program product comprising a non-transitory computer readable storage medium storing program code configured to be executed by a processor of a system which conveys web content from a server node to a terminal node along one or more network nodes, the program code causing the processor to:
  inspect a data flow transmitting said web content toward the terminal node for extracting web content records;
  correlate said extracted web content records to at least one web session;
  associate said extracted web content records to a performance of one or more of said nodes; and
  calculate a performance metric from the correlated and associated web content records for at least one web session and one or more of said nodes, wherein the performance metric is calculated by calculating a resource download time for conveying a resource to the terminal node for each of a plurality of resource requests in a same web session from records being associated to the performance of each node associated with the one or more nodes involved in conveying the resource to the terminal node,
wherein the program code further causing the processor to identify a cause of low performance based on the calculated performance metric identifying a cause of low performance by:
  computing a page loading time (PLT) overhead caused by each of a plurality of overhead sources;
  comparing absolute values of the PLT overhead of each overhead source with the PLT overhead of each other overhead source; and
  selecting a maximum PLT overhead associated with a particular overhead source as the cause of low performance.

* * * * *